United States Patent
Okitsu et al.

(10) Patent No.: US 8,582,320 B2
(45) Date of Patent: Nov. 12, 2013

(54) SELF-EXCITED SWITCHING POWER SUPPLY CIRCUIT

(75) Inventors: Katsuhiko Okitsu, Saitama (JP); Toshihiro Amei, Tokyo (JP); Kenji Hatano, Tokyo (JP); Yoshitaka Kimura, Tokyo (JP)

(73) Assignee: SMK Corporation, Tokyo (JP)

( * ) Notice: Subject to any disclaimer, the term of this patent is extended or adjusted under 35 U.S.C. 154(b) by 87 days.

(21) Appl. No.: 13/413,664

(22) Filed: Mar. 7, 2012

(65) Prior Publication Data

US 2012/0230063 A1    Sep. 13, 2012

(30) Foreign Application Priority Data

Mar. 11, 2011 (JP) ................................. 2011-054259

(51) Int. Cl.
  *H02M 3/335* (2006.01)
(52) U.S. Cl.
  USPC ........................................................... 363/19
(58) Field of Classification Search
  USPC .................. 363/18, 19, 95, 97, 131
  See application file for complete search history.

(56) References Cited

U.S. PATENT DOCUMENTS

| 4,361,865 | A | * | 11/1982 | Shono | 363/19 |
| 4,903,182 | A | * | 2/1990 | Pilukaitis et al. | 363/19 |
| 5,867,373 | A | * | 2/1999 | Lohrer et al. | 363/19 |
| 6,178,100 | B1 | * | 1/2001 | Kitano | 363/19 |
| 7,012,816 | B2 | * | 3/2006 | Amei | 363/19 |

FOREIGN PATENT DOCUMENTS

JP    3691498 B2    6/2005

* cited by examiner

*Primary Examiner* — Gary L Laxton (57) ABSTRACT

There is provided a self-excited switching power supply circuit. A cycle control capacitor is charged with a flyback voltage generated in a feedback winding of a transformer during OFF operation period in which an exciting current does not flow in a primary winding of the transformer. An OFF control capacitor the charging speed of which changes ON operation period is charged with the charging voltage of the cycle control capacitor during the ON operation period in which an exciting current flows in the primary winding. The charging voltage of the cycle control capacitor is changed with a periodic cycle Tc sufficiently longer than an oscillation cycle To to make the oscillation cycle To of continuous oscillating operation variable based on the periodic cycle Tc. As a result, the frequency of a harmonic is distributed.

6 Claims, 7 Drawing Sheets

(RELATED ART)

SELF-EXCITED SWITCHING POWER SUPPLY CIRCUIT

CROSS REFERENCE TO RELATED APPLICATION

The contents of the following Japanese patent application are incorporated herein by reference,
NO. 2011-054259 filed on Mar. 11, 2011.

BACKGROUND

1. Technical Field

The present invention relates to a self-excited switching power supply circuit that performs continuous oscillating operation by feeding a voltage appearing across a feedback winding of a transformer back positively as a driving signal to a control terminal of a switching element, and more specifically, to a self-excited switching power supply circuit that enhances noise terminal characteristics of an output.

2. Description of the Related Art

A switching power supply circuit functioning as a stabilizing power supply is used in a battery charger, an AC adapter and others. This switching power supply circuit performs constant voltage control to stabilize an output voltage at a predetermined set voltage irrespective of the magnitudes of such loads connected to the output side (see paragraphs 0033 to 0066 of the specification, and FIG. 1 of Japanese Patent No. 3691498 for example).

Figure 5:
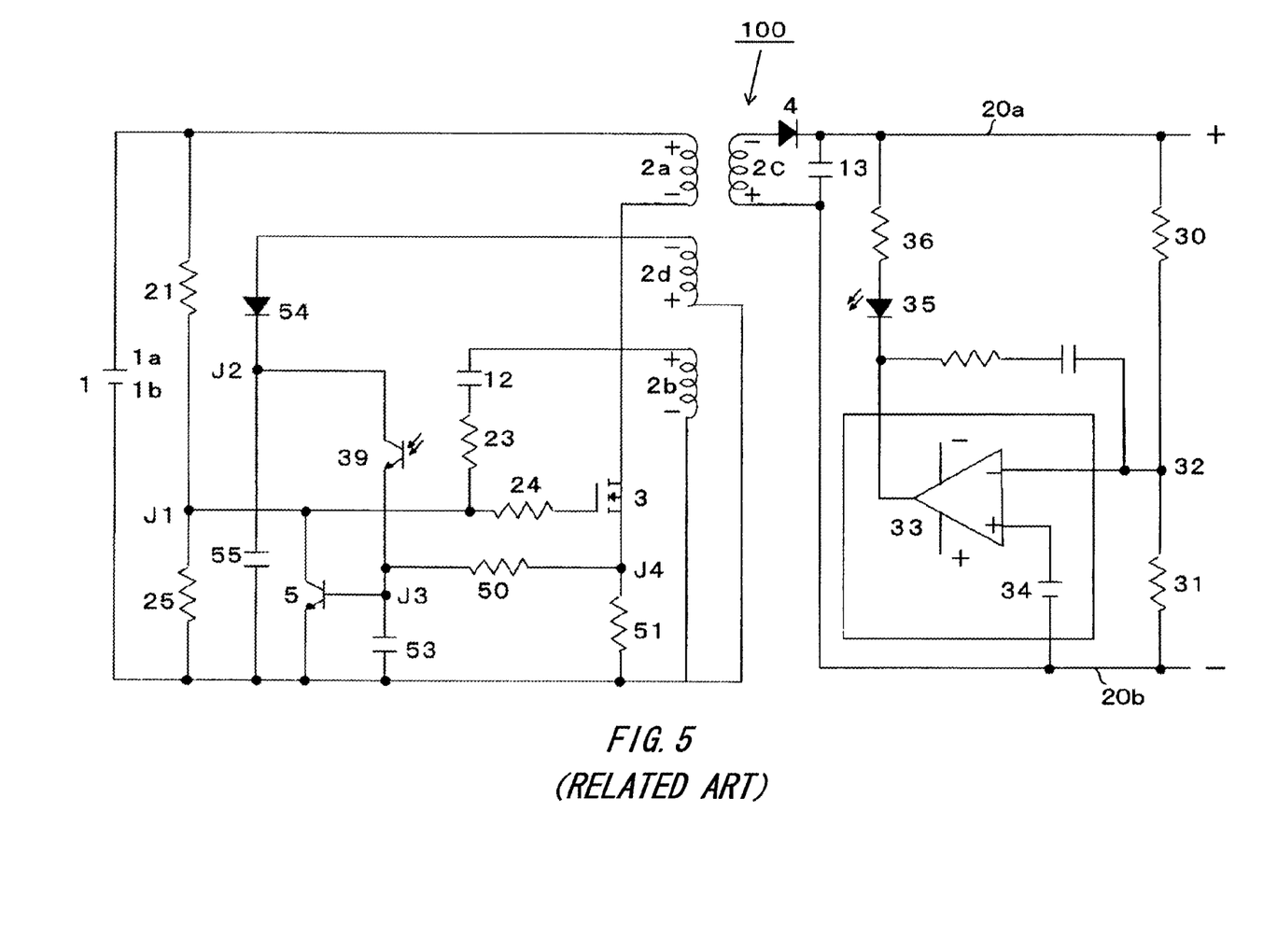
FIG. 5 is a circuit diagram of a conventional self-excited switching power supply circuit 100.
Figure 6:
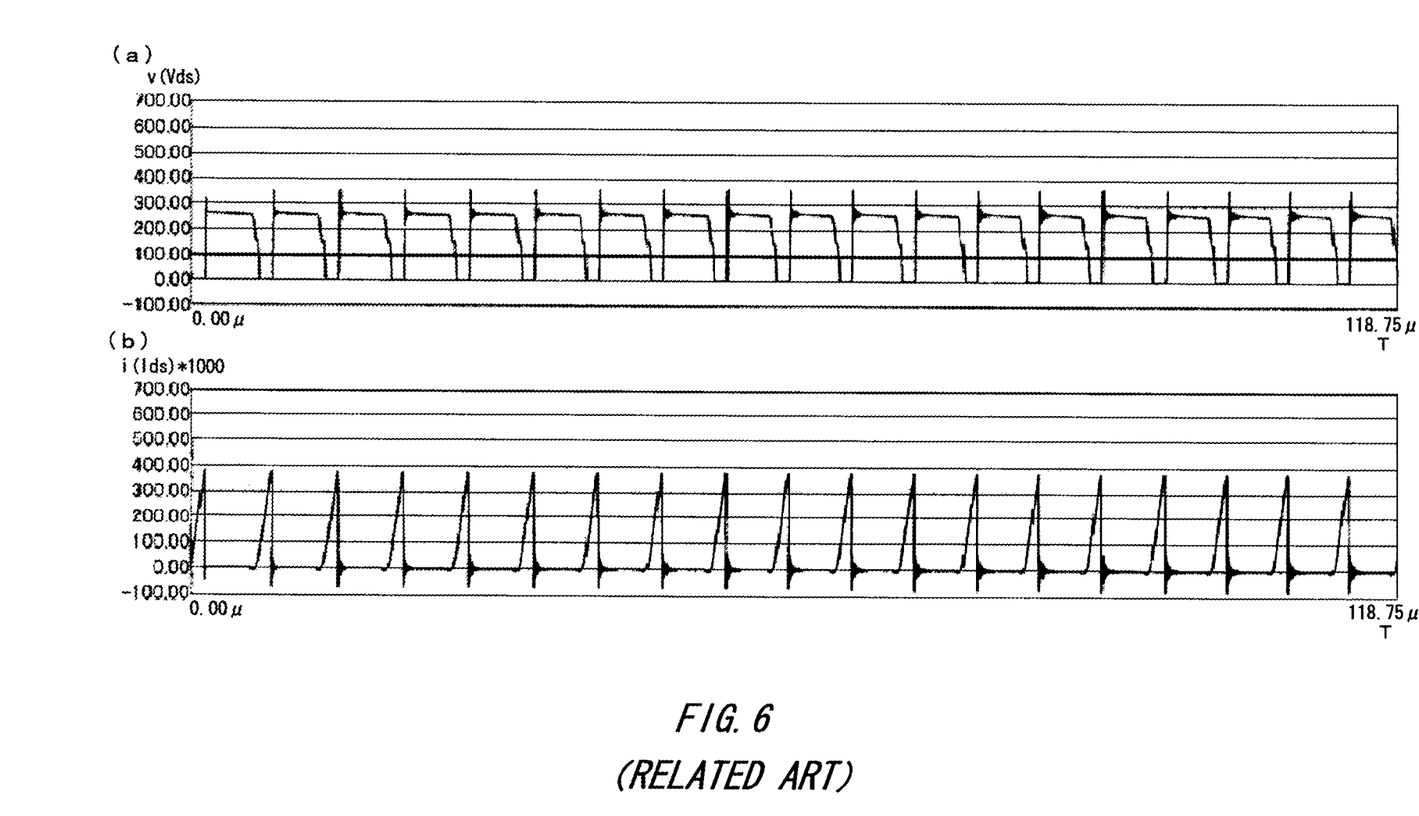
FIG. 6 is a waveform chart showing the waveform of a voltage between the drain and the source of an FET 3 and a waveform chart showing a primary winding current flowing in the drain and the source of the FET 3, while the self-excited switching power supply circuit 100 performs continuous self-excited oscillating operation under constant voltage control.

A self-excited switching power supply circuit 100 that performs the aforementioned conventional constant voltage control is described by using FIGS. 5 and 6. Reference numeral 1 is an unstable DC power supply having a fear of voltage fluctuation. Reference numerals 1a and 1b are a high-voltage side terminal and a low-voltage side terminal respectively of the DC power supply 1. Further, reference numerals 2a and 2c are a primary winding and a secondary output winding of a transformer 2, respectively, and reference numerals 2b and 2d are first and second feedback windings, respectively, provided on the primary side of the transformer 2. The first feedback winding 2b is wound in the same direction as the primary winding 2a, and the second feedback winding 2d is wound in the opposite direction to the primary winding 2a.

Reference numeral 3 shows an oscillation field effect transistor (hereinafter abbreviated as FET). Reference numeral 21 shows a start-up resistor used to apply a forward bias (in other words, a gate voltage being the same as or higher than a threshold voltage $V_{TH}$) to the gate of the FET 3 when the circuit is started. An electric resistor 25 connected in series to the start-up resistor 21 has a resistance value smaller than that of the start-up resistor 21. Thus, when the voltage of the DC power supply 1 is divided at a junction J1 between the start-up resistor 21 and the electric resistor 25 and if a low DC voltage is output, the circuit is not started.

Reference numeral 12 is an ON control capacitor which forms an ON driving circuit together with a feedback resistor 23, and which is connected in series to the feedback resistor 23 between the first feedback winding 2b and the gate of the FET 3. Reference numeral 24 is an electric resistor provided to prevent excessive input to the gate of the FET 3. Reference numeral 5 is an OFF control transistor having a collector connected to the gate of the FET 3, and an emitter connected to the low-voltage side terminal 1b.

One side of the second feedback winding 2d is connected to the low-voltage side terminal 1b of the DC power supply 1 through a rectifying diode 54 and an output control capacitor 55 connected in series, and the opposite side of the second feedback winding 2d is directly connected the low-voltage side terminal 1b of the DC power supply 1, thereby forming a closed loop. The rectifying diode 54 is arranged such that the forward direction thereof agrees with a direction in which the output control capacitor 55 is charged with a flyback voltage generated in the second feedback winding 2d.

A junction J2 between the rectifying diode 54 and the output control capacitor 55 is connected through a photocoupler light receiving element 39 to a base J3 of the OFF control transistor 5. An OFF control capacitor 53 is connected between the base J3 and the low-voltage side terminal 1b.

The base J3 of the OFF control transistor 5 is also connected through a charging and discharging resistor 50 to a junction J4 between the FET 3 and a shunt resistor 51. The OFF control capacitor 53 is charged with a voltage generated in the shunt resistor 51 as a result of flow of a primary winding current through the shunt resistor 51. If the base voltage of the base J3 reaches the operating voltage of the OFF control transistor 5, continuity is formed between the collector and the emitter of the OFF control transistor 5.

The photocoupler light receiving element 39 is put into operation by being optically coupled to a photocoupler light emitting element 35 belonging to the secondary side of the transformer 2. If receiving light from the photocoupler light emitting element 35, the photocoupler light receiving element 39 causes a discharging current from the output control capacitor 55 to flow from the junction J2 to the base J3 in response to the amount of the received light.

Reference numerals 4 and 13 shown on the same side as the secondary output winding 2c are a rectifying diode and a smoothing capacitor, respectively, forming a rectifying and smoothing circuit. The rectifying diode 4 and the smoothing capacitor 13 rectify and smooth the output of the secondary output winding 2c, and give the resultant output between a high-voltage side output line 20a and a low-voltage side output line 20b.

Voltage dividing resistors 30 and 31 are connected in series between the high-voltage side output line 20a and the low-voltage side output line 20b. A voltage dividing point 32 of the voltage dividing resistors 30 and 31 is connected to the inverting input terminal of an error amplifier 33. Accordingly, an output detecting voltage obtained by dividing an output voltage is applied to the inverting input terminal. A reference power supply 34 is connected between the non-inverting input terminal of the error amplifier 33 and the low-voltage side output line 20b. Accordingly, a reference voltage to be compared with the output detecting voltage is applied to the non-inverting input terminal. The reference voltage is a voltage obtained by dividing a predetermined set voltage at the voltage dividing resistors 30 and 31, the set voltage being used for the constant voltage control between the high-voltage side output line 20a and the low-voltage side output line 20b. Accordingly, the output of the error amplifier 33 indicates a difference of an output voltage from the set voltage.

The photocoupler light emitting element 35 is connected to the output side of the error amplifier 33. The photocoupler light emitting element 35 is connected through an electric resistor 36 to the high-voltage side output line 20a, and flashes on and off according to the output value of the error amplifier 33. As a result, the photocoupler light emitting element 35 emits light of an amount corresponding to the aforementioned difference between the voltages, and the photocoupler light receiving element 39 belonging to the primary side and optically coupled to the photocoupler light emitting element 35 causes a current responsive to the difference between the voltages to flow from the junction J2 to the base J3.

In the self-excited switching power supply circuit 100 of the aforementioned structure, if a DC voltage is applied first between the high-voltage side terminal 1a and the low-voltage side terminal 1b of the DC power supply 1, the ON control capacitor 12 (in FIG. 5, the lower electrode is a positive electrode and the upper electrode is a negative electrode) is charged through the start-up resistor 21 to increase the charging voltage of the ON control capacitor 12 gradually. If the charging voltage of the ON control capacitor 12 reaches the threshold voltage $V_{TH}$, a forward bias voltage is applied to the gate of the FET 3, thereby turning the FET 3 on (forming continuity between the drain and the source).

When the FET 3 is turned on and an exciting current starts to flow from the DC power supply 1 to the primary winding 2a connected in series to the FET 3, induced electromotive force is generated in each winding of the transformer 2 to store exciting energy in the transformer 2. A voltage generated at this time at a junction J4 between the shunt resistor 51 and the FET 3 as a result of flow of a current in the primary winding 2a is supplied through the charging and discharging resistor 50 to the OFF control capacitor 53 for charging. The current flowing in the primary winding 2a increases in proportion to the time elapsed after the FET 3 is turned on. Accordingly, if the charging voltage of the OFF control capacitor 53 reaches the operating voltage of the OFF control transistor 5, continuity is formed between the collector and the emitter of the OFF control transistor 5. This brings the gate of the FET 3 into a state where the gate of the FET 3 is substantially shorted by the OFF control transistor 5, thereby turning the FET 3 off (hereinbelow, a period from when the FET 3 is turned on and until when the FET 3 is turned off is called an ON operation period, and a period from when the FET 3 is turned off and until when the FET 3 is turned on next time is called an OFF operation period).

When the FET 3 is turned off and a current flowing in the transformer 2 is interrupted substantially, a voltage what is called a flyback voltage (induced counter-electromotive force) is generated in each winding. A flyback voltage generated at this time in the secondary output winding 2c is rectified and smoothed by the rectifying and smoothing circuit composed of the rectifying diode 4 and the capacitor 13, and is output as electric power to be supplied to a load connected between the output lines 20a and 20b.

Further, a load connected to the output side makes a flyback voltage generated in the first feedback winding 2b proportionate to the flyback voltage generated in the secondary output winding 2c. The flyback voltage generated in the feedback winding 2b is supplied to the ON control capacitor 12 for charging (in FIG. 5, the lower electrode is a positive electrode and the upper electrode is a negative electrode).

During the OFF operation period, a discharging current flows from the OFF control capacitor 53 into the charging and discharging resistor 50 and the shunt resistor 51 to reduce the charging voltage of the OFF control capacitor 53, namely the base voltage of the OFF control transistor 5 to the operating voltage or lower. Further, an equivalent diode is formed between the base and the collector of the OFF control transistor 5. The ON control capacitor 12 is charged with the flyback voltage generated in the first feedback winding 2b through a charging path formed by the shunt resistor 51, the charging and discharging resistor 50, the base and the collector of the OFF control transistor 5, and the feedback resistor 23.

If emission of electric energy from in the secondary output winding 2c is finished, the flyback voltage of the feedback winding 2b functioning as a negative bias for the gate of the FET 3 drops. Then, a charging voltage stored in the ON control capacitor 12 makes the gate voltage of the FET 3 exceed the threshold voltage $V_{TH}$ to turn the FET 3 on again. A series of the aforementioned oscillating operation is repeated.

Energy stored in the transformer 2 in one oscillation cycle is substantially proportionate to the square of energy stored during the ON operation period of the FET 3. The photocoupler light emitting element 35 does not emit light if the output voltage of the secondary side does not reach the set voltage. Accordingly, the FET 3 operates in the maximum ON time determined by the resistance value of the shunt resistor 51, irrespective of a speed at which the OFF control capacitor 53 is charged. The maximum ON time is determined such that energy stored in the transformer 2 becomes slightly greater than the sum of energy consumed by a load of rated power consumption and energy consumed by the switching operation of the self-excited switching power supply circuit 100. As a result, the output voltage increases to the set voltage while oscillating operation is repeated. If the output voltage exceeds the set voltage, a transition is made to continuous self-excited oscillating operation that is generally performed under the constant voltage output control.

During the OFF operation period of the FET 3, the output control capacitor 55 is also charged with the flyback voltage generated in the second feedback winding 2d through the rectifying diode 54. If the output voltage between the high-voltage side output line 20a and the low-voltage side output line 20b is higher than the set voltage when the FET 3 is turned on, the photocoupler light emitting element 35 emits light of an amount corresponding to a difference between the output voltage and the set voltage. Then, the photocoupler light receiving element 39 optically coupled to the photocoupler light emitting element 35 causes a discharging current proportionate to the difference between the voltages to flow from the output control capacitor 55 into the junction (base) J3 through the junction J2.

Thus, at a time immediately after the FET 3 is turned on, the OFF control capacitor 53 charged by voltage drop across the shunt resistor 51 caused by the exciting current flowing in the primary winding 2a is further charged with the charging voltage of the output control capacitor 55. This charges the OFF control capacitor 53 at a higher speed, so that the base voltage of the OFF control transistor 5 reaches the operating voltage within a time shorter than the maximum ON time.

This brings the gate of the FET 3 and the low-voltage side terminal 1b into a state where the gate of the FET 3 and the low-voltage side terminal 1b are substantially shorted with each other by the OFF control transistor 5, thereby turning the FET 3 off without delay after turn-on of the FET 3. Thus, the ON operation period is shortened in one oscillation cycle, and this reduces energy stored in the transformer 2 to lower the output voltage. The constant voltage control of the output voltage is realized by following the aforementioned processes.

The conventional self-excited switching power supply circuit 100 performs the constant voltage control in each oscillation cycle. The ON operation period in which the output voltage is changed under the constant voltage control is very short while the self-excited switching power supply circuit 100 performs continuous oscillating operation stably after the output voltage reaches the predetermined set voltage. Meanwhile, as long as the ON operation period is constant and power to be consumed by a load does not change, the OFF operation period is also constant in each oscillation cycle. Accordingly, the self-excited switching power supply circuit 100 operates at a substantially fixed oscillating frequency after the output voltage is stabilized at a level near the set voltage under the constant voltage control.

As an example, if the self-excited switching power supply circuit 100 is controlled under the constant voltage control to produce an output voltage to a load of 16 V and an output current of 1.2 A with a DC power supply voltage of 240 V, the ON and OFF operation periods in each oscillation cycle To do not change and stay at their substantially constant levels after the output voltage reaches the set voltage of 16 V. In this case, the self-excited switching power supply circuit 100 performs continuous oscillating operation with a fixed oscillation cycle of 160 kHz, generating harmonic noise between the output lines 20a and 20b caused by a second-order harmonic or a higher-order harmonic.

Figure 7:
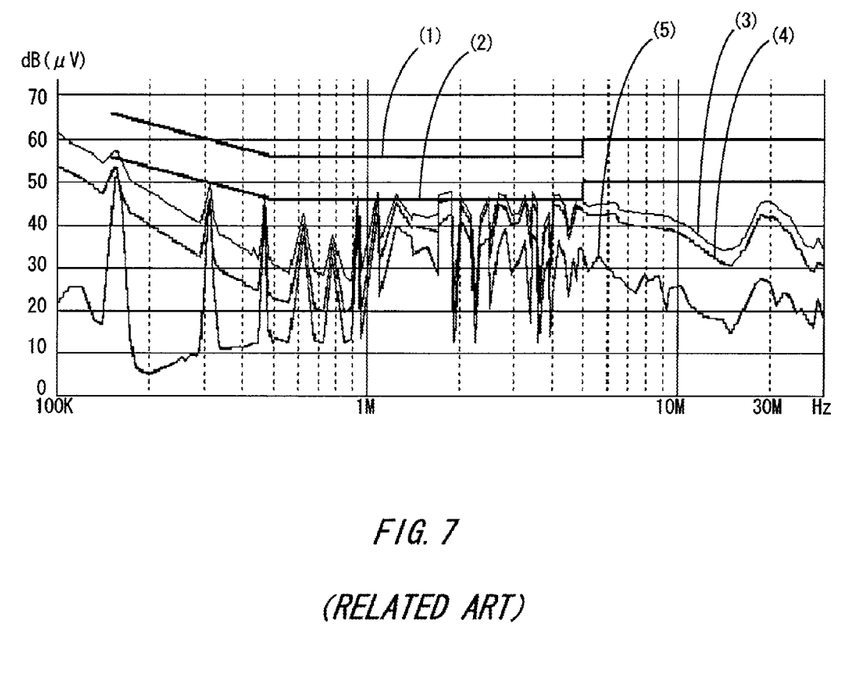
FIG. 7 is a waveform chart showing noise voltage characteristics appearing in the output of the self-excited switching power supply circuit 100 and the upper limits specified in International Standard CISPR22 in comparison to each other, and including (1) the upper limit in the QP mode specified in International Standard, (2) the upper limit in the AVR mode specified in International Standard, (3) a peak value of a noise voltage appearing in the output, (4) a noise voltage appearing in the output obtained in the QP mode, and (5) a noise voltage appearing in the output obtained in the AVR mode.

Regarding the characteristics of a noise voltage appearing in the output of a self-excited switching power supply circuit, International Standard CISPR22 for information technology equipment (ITE) specifies in class B upper limits determined in a QP mode (quasi-peak detection) and an AVR mode (average detection) in a frequency band of from 0.15 MHz to 30 MHz as shown in FIG. 7. If the self-excited switching power supply circuit 100 operates continuously with a fixed oscillation cycle of 160 kHz, second-order harmonic noise and harmonic noises of higher orders appear in the output of the self-excited switching power supply circuit 100 at frequencies of 320 kHz, 480 kHz, 640 kHz and others that are integral multiples of the fixed oscillation cycle. Margins with respect to the upper limits (1) and (2) specified in International Standard are reduced at these particular frequencies, generating a fear of excess of measured values (4) and (5) over the upper limits.

A noise component of a harmonic becomes greater with a lower order of an oscillating frequency. Accordingly, reduction of the oscillating frequency is desired. However, reduction of the oscillating frequency involves size increase of the self-excited switching power supply circuit 100. Further, provision of a large-capacity filter in a power supply line on the output side has been thought of, which results in increase of the cost of the entire circuit.

SUMMARY

The present invention has been made in consideration of the aforementioned problems. It is an object of the invention to provide a self-excited switching power supply circuit that prevents generation of harmonic noise at a particular frequency while the self-excited switching power supply circuit operates stably under constant voltage control.

In order to achieve the aforementioned object, a self-excited switching power supply circuit according to a first aspect of the present invention includes: a transformer with a primary winding, a secondary output winding, a first feedback winding, and a second feedback winding; an oscillation field effect transistor connected to a DC power supply while being connected in series to the primary winding, the oscillation field effect transistor performing ON operation when the gate voltage thereof is equal to or higher than a threshold voltage $V_{TH}$; a start-up resistor connected between a high-voltage side terminal of the DC power supply and a gate of the oscillation field effect transistor; an ON control capacitor connected between one side of the first feedback winding and the gate of the oscillation field effect transistor, an opposite side of the first feedback winding being connected to a low-voltage side terminal of the DC power supply, the ON control capacitor applying a voltage for controlling ON of the oscillation field effect transistor to the gate of the oscillation field effect transistor; a driver element connected between the gate of the oscillation field effect transistor and the low-voltage side terminal of the DC power supply, the driver element forming continuity between the gate of the oscillation field effect transistor and the low-voltage side terminal if a control terminal voltage is equal to or higher than an operating voltage, thereby controlling OFF of the oscillation field effect transistor; a shunt resistor connected between the oscillation field effect transistor and the low-voltage side terminal; and an OFF control capacitor connected between a control terminal of the driver element and the low-voltage side terminal, the OFF control capacitor being charged with a voltage of the shunt resistor in which an exciting current from the primary winding flows during ON operation period of the oscillation field effect transistor, thereby increasing the control terminal voltage to the operating voltage or higher. The oscillation field effect transistor is turned off with the charging voltage of the OFF control capacitor during the ON operation period of the oscillation field effect transistor, and is turned on with the charging voltage of the ON control capacitor during OFF operation period of the oscillation field effect transistor, thereby making the ON operation period and the OFF operation period appear repeatedly with a predetermined oscillation cycle. The self-excited switching power supply circuit further includes: a cycle control capacitor connected between the control terminal of the driver element and the low-voltage side terminal; a backflow preventing element connected between the second feedback winding and the cycle control capacitor, the backflow preventing element causing a charging current to flow during the OFF operation period of the oscillation field effect transistor to charge the cycle control capacitor with a flyback voltage generated in the second feedback winding; a time constant resistor connected between the second feedback winding and the low-voltage side terminal of the DC power supply while being connected in series to the cycle control capacitor, the time constant resistor controlling a speed at which the cycle control capacitor is charged; and a shorting circuit connected in parallel to the cycle control capacitor, the shorting circuit forming a short circuit across the cycle control capacitor with a periodic cycle sufficiently longer than the oscillation cycle each time the charging voltage of the cycle control capacitor reaches a predetermined voltage. The self-excited switching power supply circuit is characterized in that the OFF control capacitor is charged with the charging voltage of the cycle control capacitor as well as with the voltage of the shunt resistor to shorten the ON operation period until when the driver element turns the oscillation field effect transistor off.

The cycle control capacitor is charged with the flyback voltage generated in the second feedback winding in the OFF operation period while causing a discharging current to charge the OFF control capacitor to flow in the ON operation period. The charging voltage of the cycle control capacitor is increased by following the oscillation cycle repeatedly. A speed at which the OFF control capacitor is charged is increased in response to increase of the charging voltage of the cycle control capacitor to shorten the ON operation period until when the oscillation field effect transistor is turned off. This further shortens time for the flyback voltage to vanish during the OFF operation period, thereby also shortening the OFF operation period. As a result, each oscillation cycle with the OFF operation period in addition to the ON operation period is shortened gradually. Accordingly, if the charging voltage of the cycle control capacitor reaches the predetermined voltage with the periodic cycle sufficiently longer than the oscillation cycle of the oscillation field effect transistor, charges stored in the cycle control capacitor are emitted by the shorting circuit. This reduces the charging voltage of the cycle control capacitor to a potential at a time in a previous periodic cycle, so that an oscillation cycle in the previous periodic cycle appears again.

Thus, even if oscillating operation is performed stably under constant voltage control, an oscillating frequency that gradually increases returns to its default oscillating frequency with each periodic cycle, thereby avoiding continuous oscillation at a fixed oscillating frequency. As a result, harmonic noise at a particular frequency will not be superimposed on an output line.

The self-excited switching power supply circuit according to a second aspect of the present invention is characterized in that the cycle control capacitor and the time constant resistor that are connected in series are connected between the second feedback winding and the low-voltage side terminal of the DC power supply while being connected in parallel to an output control capacitor charged with the flyback voltage generated in the second feedback winding of the transformer, and that the output control capacitor charges the OFF control capacitor with the charging voltage of the output control capacitor during the ON operation period in response to a difference between an output voltage exceeding a set voltage and the set voltage.

The OFF control capacitor is charged from the output control capacitor at a speed that is increased in response to the voltage difference corresponding to the excess of the output voltage over the set voltage to shorten the ON operation period, thereby controlling the output voltage under the constant voltage control. The second feedback winding used for the constant voltage control can also be used in a circuit to change an oscillating frequency.

The self-excited switching power supply circuit according to a third aspect of the present invention is characterized in that the shorting circuit includes series-connected voltage dividing resistors as a pair connected to the opposite sides of the cycle control capacitor, and an NPN transistor having a collector and an emitter connected to the opposite sides of the cycle control capacitor, and a base connected to a voltage dividing point of the voltage dividing resistors as a pair.

If a divided voltage at the voltage dividing point of the voltage dividing resistors obtained by dividing the charging voltage of the cycle control capacitor reaches the operating voltage of the NPN transistor, continuity is formed between the collector and the emitter of the NPN transistor to form a short circuit across the cycle control capacitor. The charging voltage of the cycle control capacitor increases with each oscillation cycle. A divided voltage obtained by dividing this charging voltage reaches the operating voltage of the NPN transistor with each periodic cycle, and then charges in the cycle control capacitor are all discharged.

The self-excited switching power supply circuit according to a fourth aspect of the present invention is characterized in that the shorting circuit includes series-connected voltage dividing resistors as a pair connected to the opposite sides of the cycle control capacitor, and a thyristor or a triac having a trigger terminal connected to a voltage dividing point of the voltage dividing resistors as a pair, and an output terminal opposite ends of which are connected to the opposite sides of the cycle control capacitor.

A method of controlling a switching power supply device according to a fifth aspect of the present invention is a method of controlling a switching power supply device including controlling application of a voltage or shutdown of application of a voltage to a primary side of a transformer by a switching element composed of an oscillation field effect transistor, and transmitting electric power to the secondary side of the transformer to output a voltage, the switching element having a control terminal and connected in series to a primary winding of the transformer, the switching element making ON operation if a voltage generated in a feedback winding of the transformer makes a voltage at the control terminal reach a threshold voltage, the switching element making OFF operation if the charging voltage of an OFF control capacitor controls the voltage at the control terminal to be lower than the threshold voltage. The method is characterized in that, a cycle control capacitor is charged with a flyback voltage generated in the feedback winding of the transformer during OFF operation by which an exciting current does not flow in the primary winding of the transformer, the cycle control capacitor receiving a charging voltage that changes within an interval sufficiently longer than one oscillation cycle of the switching element, and the OFF control capacitor is charged with the charging voltage of the cycle control capacitor during ON operation by which an exciting current flows in the primary winding of the transformer, and in that the charging voltage of the cycle control capacitor changes a speed at which the OFF control capacitor is charged to change the oscillation cycle of the switching element.

The method of controlling the switching power supply device according to a sixth aspect of the present invention is characterized in that the charging voltage of the cycle control capacitor increases a speed at which the OFF control capacitor is charged to shorten ON operation period until when the switching element performs OFF operation.

According to the first aspect of the present invention, an oscillating frequency changes with the periodic cycle while the continuous oscillating operation is performed stably under the constant voltage control. Accordingly, a noise voltage generated in an output line is distributed, making it possible to comply with International Standard that specifies noise voltage characteristics without the need of taking countermeasures such as provision of a filter in the output line.

According to the second aspect of the present invention, the cycle control capacitor is charged by using the second feedback winding used for charge of the output control capacitor. This makes it possible to change an oscillating frequency without the need of separately providing means for charging the cycle control capacitor.

Further, the duty ratio of the output of the second feedback winding changes in the OFF operation period in response to variations of an output load. The cycle control capacitor is charged by using the second feedback winding, so that a speed at which the cycle control capacitor is charged is also changed by the variations of the output load. Further, the periodic cycle itself is changed. This is expected to realize more effective countermeasures against a noise voltage during actual operation.

According to the third aspect of the present invention, the charging voltage of the cycle control capacitor for shorting the cycle control capacitor can be set by controlling the resistance values of the voltage dividing resistors as a pair. This makes it possible to control the periodic cycle freely only by exchanging voltage dividing resistors as a pair.

According to the fourth aspect of the present invention, a thyristor or a triac is used as the trigger element of the shorting circuit, making it possible to simplify the shorting circuit.

DESCRIPTION OF EXEMPLARY EMBODIMENTS

Figure 1:
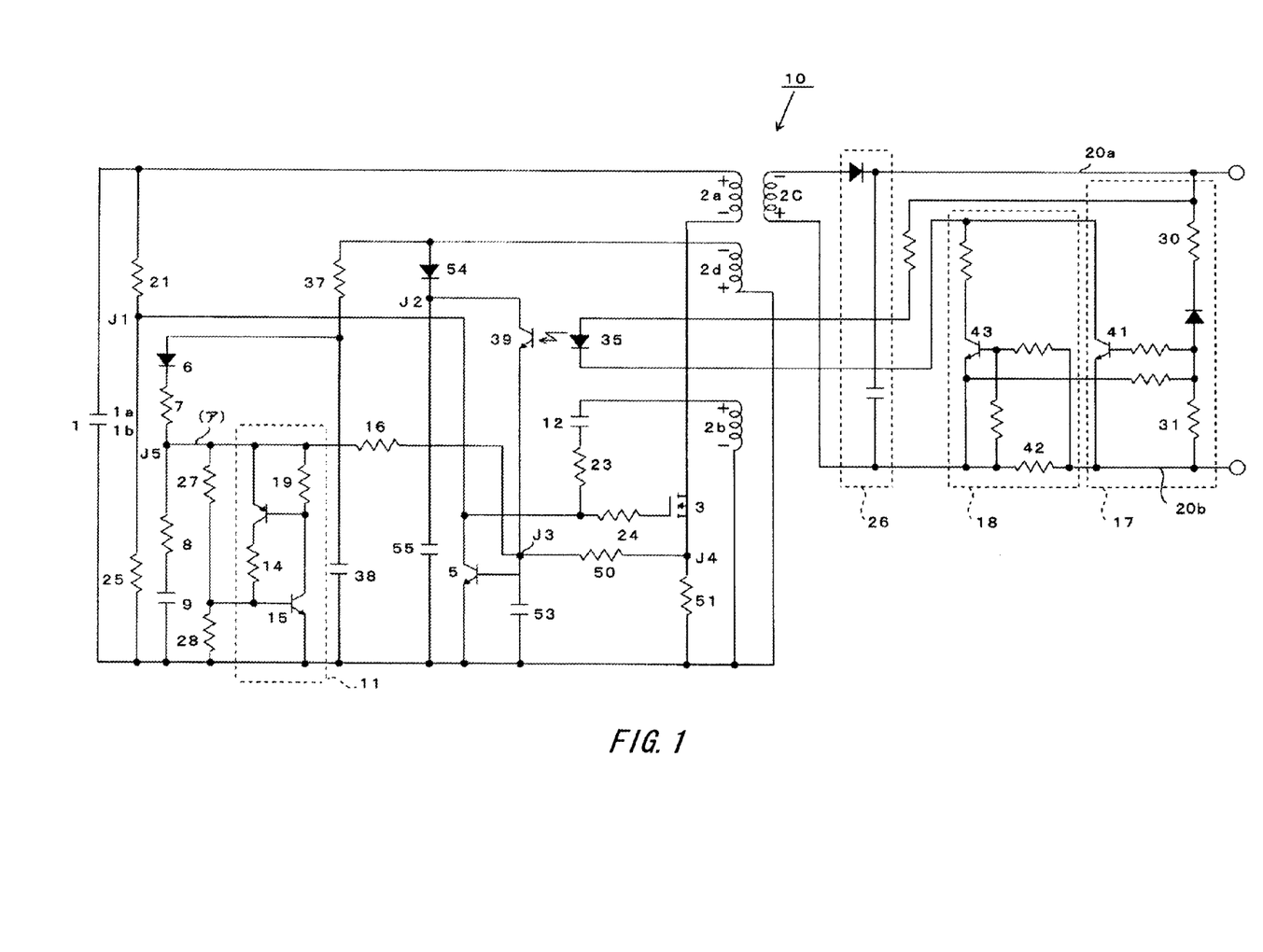
FIG. 1 is a circuit diagram of a self-excited switching power supply circuit 10 according to an embodiment of the invention.

An embodiment of the invention will be described in detail with reference to FIGS. 1 to 4. FIG. 1 is a circuit diagram showing the structure of a self-excited switching power supply circuit 10 according to the embodiment of the invention. A principal circuit and principal circuit elements of the self-excited switching power supply circuit 10 according to the embodiment are the same as those of the conventional self-excited switching power supply circuit 100 shown in FIG. 5. Accordingly, the structures in common are identified by the same reference numerals, and will not be described in detail.

As shown in FIG. 1, a transformer 2 includes a primary winding 2a, a first feedback winding 2b wound in the same direction as the primary winding 2a, and a second feedback winding 2d wound in the opposite direction to the primary winding 2a provided on the primary side, and a secondary output winding 2c provided on the secondary side.

The primary winding 2a is connected to a DC power supply 1 while being connected in series to an oscillation field effect transistor 3 (hereinafter abbreviated as FET). ON and OFF operations of the FET 3 controls ON and OFF of an exciting current to flow in the primary winding 2a. Here, an MOSFET is used as the FET 3. The FET 3 has a drain connected to the primary winding 2a, and a source connected through a shunt resistor 51 provided for detection of a primary winding current to a low-voltage side terminal 1b of the DC power supply 1.

The gate of the FET 3 is connected, through an electric resistor 24 for preventing excessive input to the gate of the FET 3, to a junction J1 between a start-up resistor 21 and an electric resistor 25 connected in series and connected to the DC power supply 1. The respective resistance values of the start-up resistor 21 and the electric resistor 25 are set at 14.1 MΩ and 750 kΩ, respectively, to reduce power consumption by the start-up resistor 21.

An ON control capacitor 12 and a feedback resistor 23 affecting the ON operation of the FET 3 are connected in series between the junction J1 between the start-up resistor 21 and the electric resistor 25, and one side of the first feedback winding 2b. The opposite side of the first feedback winding 2b is connected to the low-voltage side terminal 1b of the DC power supply 1.

A driver element 5 for controlling OFF of the FET 3 by reducing the gate voltage of the FET 3 is provided between the junction J1 between the start-up resistor 21 and the electric resistor 25, and the low-voltage side terminal 1b. Here, an NPN OFF control transistor is used as the driver element 5. The OFF control transistor 5 has a collector connected to the junction J1, and an emitter connected to the low-voltage side terminal 1b. The base of the OFF control transistor 5 is connected through an OFF control capacitor 53 to the low-voltage side terminal 1b. The base of the OFF control transistor 5 is also connected through a charging and discharging resistor 50 to the high-voltage side of the shunt resistor 51. If voltage drop caused by the shunt resistor 51 reaches a constant value or becomes higher than the constant value, a base voltage represented as the charging voltage of the OFF control capacitor 53 increases to cause the OFF control transistor 5 to perform ON operation.

One side of the second feedback winding 2d is connected to the low-voltage side terminal 1b of the DC power supply 1 through a rectifying diode 54 and an output control capacitor 55 connected in series. Further, the opposite side of the second feedback winding 2d is directly connected to the low-voltage side terminal 1b of the DC power supply 1, thereby forming a closed loop. The rectifying diode 54 is arranged such that the forward direction thereof agrees with a direction in which the rectifying diode 54 is connected to the output control capacitor 55. The output control capacitor 55 is charged with a flyback voltage generated in the second feedback winding 2d. A junction J2 between the rectifying diode 54 and the output control capacitor 55 is connected through a photocoupler light receiving element 39 to a junction 3 with the base of the OFF control transistor 5.

The photocoupler light receiving element 39 is put into operation by being optically coupled to a photocoupler light emitting element 35 belonging to the secondary side of the transformer 2. While receiving light emitted from the photocoupler light emitting element 35, the photocoupler light receiving element 39 causes a discharging current emitted from the output control capacitor 55 to flow therein in proportion to the amount of the received light.

Unlike in the conventional circuit, an electric resistor 37 and a capacitor 38 are provided in the embodiment that are connected in series between the one side of the second feedback winding 2d and the low-voltage side terminal 1b to form a CR low-pass filter as shown in FIG. 1. Further, a rectifying diode 6, a time constant resistor 7, a discharge protective resistor 8, and a cycle control capacitor 9 are connected in parallel to the capacitor 38, while being connected in series in this order.

The rectifying diode 6 is arranged such that the forward direction thereof agrees with a direction in which the rectifying diode 6 is connected to the time constant resistor 7.

Accordingly, the cycle control capacitor 9 as well as the output control capacitor 55 is charged with the flyback voltage generated in the second feedback winding 2d. The cycle control capacitor 9 is charged with a flyback voltage generated in each oscillation cycle To at a speed determined by a time constant responsive to the capacitance of the cycle control capacitor 9 and the resistance values of the time constant resistor 7 and the discharge protective resistor 8 connected in series. A transitional period determined by the time constant is set to be sufficiently longer than the oscillation cycle To of the self-excited switching power supply circuit 10 that performs continuous oscillating operation.

The discharge protective resistor 8 is connected in series to the cycle control capacitor 9 in order to prevent an excessive short-circuit current that might flow if a short circuit is formed across the cycle control capacitor 9 by a shorting circuit 11 with a PNP transistor 14 and an NPN transistor 15 described later.

A junction J5 between the time constant resistor 7 and the discharge protective resistor 8 is connected through a discharge resistor 16 to the base of the OFF control transistor 5. Accordingly, while the shorting circuit 11 does not perform short-circuit operation, a charging current to charge the OFF control capacitor 53 flows from the cycle control capacitor 9 into the discharge protective resistor 8 and the discharge resistor 16.

The NPN transistor 15 forming the shorting circuit 11 has an emitter connected to the low-voltage side terminal 1b of the DC power supply 1, and a collector connected to the junction 5 through a collector resistor 19 and to the base of the PNP transistor 14. The PNP transistor 14 has an emitter connected to the junction J5, and a collector connected to the base of the NPN transistor 15 through a bias resistor, and to a voltage dividing point formed by a pair of voltage dividing resistors 27 and 28 connected in series between the junction J5 and the low-voltage side terminal 1b. Accordingly, if the charging voltage of the cycle control capacitor 9 reaches a constant potential, a divided voltage obtained by dividing this charging voltage at the voltage dividing resistors 27 and 28 reaches the operating voltage of the NPN transistor 15 to form continuity between the collector and the emitter of the NPN transistor 15. Also, a collector current is caused to flow in the collector resistor 19 to form further continuity between the collector and the emitter of the PNP transistor 14. This increases a short-circuit current to flow in the shorting circuit 11 formed between the junction J5 and the low-voltage side terminal 1b, thereby discharging charges promptly from the cycle control capacitor 9.

Figure 2:
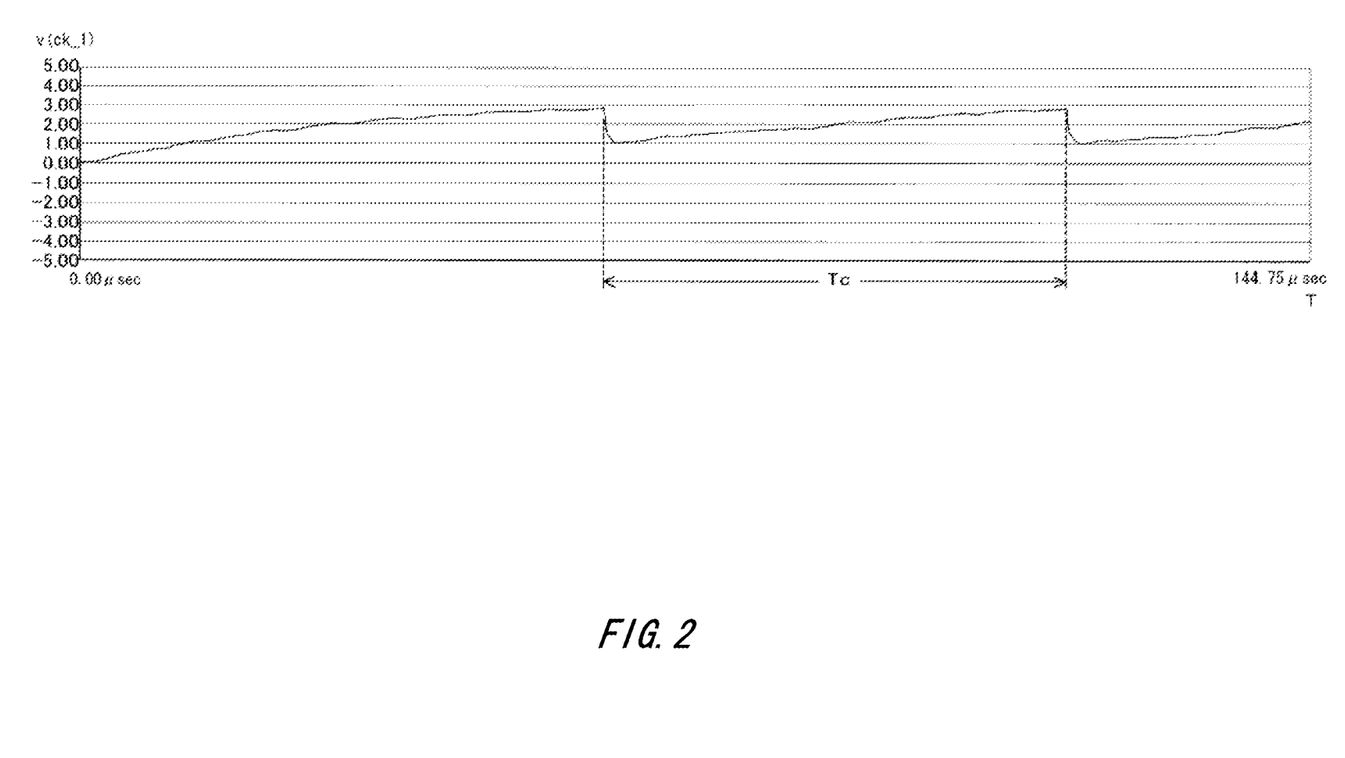
FIG. 2 is a waveform chart showing the waveform of a voltage detected in part (A) of FIG. 1.

The cycle control capacitor 9 is charged with the flyback voltage generated in the second feedback winding 2d in an OFF operation period in one oscillation cycle To during which the FET 3 performs ON and OFF operations. The respective resistance values of the voltage dividing resistors 27 and 28 are determined such that, while the cycle control capacitor 9 repeats charge and discharge to cause a charging current to flow in the OFF control capacitor 53 in an ON operation period, the charging voltage of the cycle control capacitor 9 is increased gradually as shown in FIG. 2 to make a divided voltage obtained by dividing the charging voltage of the cycle control capacitor 9 (potential at the junction J5) reach the operating voltage of the NPN transistor 15 in a periodic cycle Tc sufficiently longer than the oscillation cycle To of the FET 3. In response, the shorting circuit 11 repeats short-circuit operation with the periodic cycle Tc to change the charging voltage of the cycle control capacitor 9 repeatedly with the periodic cycle Tc as shown in FIG. 2.

An output side rectifying and smoothing circuit 26 with a rectifying diode and a smoothing capacitor is connected to the secondary output winding 2c of the transformer 2. The rectifying diode and the smoothing capacitor are connected in series and in parallel to the secondary output winding 2c, respectively. The output side rectifying and smoothing circuit 26 rectifies and smoothes a DC power supply, and gives the resultant output between a high-voltage side output line 20a and a low-voltage side output line 20b. The self-excited switching power supply circuit 10 according to the embodiment includes an output voltage monitoring circuit 17 and an output current monitoring circuit 18 for controlling an output voltage and an output current between the output lines 20a and 20b at a set voltage and a set current.

The respective resistance values of series-connected voltage dividing resistors 30 and 31 in the output voltage monitoring circuit 17 are determined such that, if the output voltage between the high-voltage side output line 20a and the low-voltage side output line 20b becomes the predetermined set voltage, voltage drop generated by the voltage dividing resistor 31 being one of the voltage dividing resistors 30 and 31 causes an NPN transistor 41 to operate actively. Accordingly, if the output voltage exceeds the set voltage, a current proportionate to a difference between these voltages flows in the photocoupler light emitting element 35. In response, the photocoupler light emitting element 35 emits light of an amount corresponding to the difference between the voltages.

The output current monitoring circuit 18 has a shunt resistor 42 connected in series to the low-voltage side output line 20b. The output current monitoring circuit 18 is configured such that, if an output current flowing in the shunt resistor 42 becomes the predetermined set current, voltage drop generated by the shunt resistor 42 causes an NPN transistor 43 to operate actively. Accordingly, if the output current exceeds the set current, a current proportionate to a difference between these currents flows in the photocoupler light emitting element 35. In response, the photocoupler light emitting element 35 emits light of an amount corresponding to the difference between the currents.

As described above, the photocoupler light emitting element 35 is optically coupled to the photocoupler light receiving element 39 belonging to the primary side of the transformer 2. If the output current exceeds the set current or if the output voltage exceeds the set voltage, a discharging current corresponding to the excess is supplied in the ON operation period of the FET 3 from the output control capacitor 55 having been charged during the OFF operation period of the FET 3 into the OFF control capacitor 53. This charges the OFF control capacitor 53 at a higher speed to cause the OFF control capacitor 53 to perform ON operation promptly, thereby shortening the ON operation period of the FET 3. As a result, energy stored in the transformer 2 during the ON operation period is reduced, so that the output voltage or the output current having exceeded the corresponding set value is controlled to be reduced to the set voltage or the set current.

If a load is connected between the output lines 20a and 20b, the self-excited switching power supply circuit 10 repeats continuous oscillating operation to increase the output current to the set current. Then, the output voltage is increased to the set voltage under constant current control by which the output current is controlled at the set current. If the load consumes power constantly, the output current is thereafter reduced to a current appropriate for power consumption by the load under constant voltage control by which the output voltage is controlled at the set voltage. In this state, energy generated in the transformer 2 in one oscillation cycle To is made to be appropriate for power consumption by the load, so that the self-excited switching power supply circuit 10 repeats oscillating operation with the substantially constant oscillation cycle To.

However, even if oscillating operation is performed stably with the constant oscillation cycle To under the constant voltage control, each oscillation cycle To is changed on the basis of the periodic cycle Tc sufficiently longer than the oscillation cycle To to avoid fixation of an oscillating frequency. This is achieved by the oscillating operation of the self-excited switching power supply circuit 10 described in detail below.

The flyback voltage generated in the second feedback winding 2d in the OFF operation period in one oscillation cycle To acts in the forward direction of the rectifying diode 6. Accordingly, the cycle control capacitor 9 is charged with the flyback voltage slowly at a speed determined by the time constants of the time constant resistor 7 and the discharge protective resistor 8 connected in series. Switching noise generated by turn-off of the FET 3 is superimposed on the rising edge of the flyback voltage. However, this switching noise is removed by the low-pass filter composed of the electric resistor 37 and the capacitor 38.

If the flyback voltage generated in the second feedback winding 2d vanishes and the polarity of each winding of the transformer 2 is reversed, a discharging current flows from the OFF control capacitor 53 into the charging and discharging resistor 50 and the shunt resistor 51 to reduce the base voltage of the OFF control transistor 5. This breaks continuity between the collector and the emitter of the OFF control transistor 5 to turn the FET 3 on. In the ON operation period starting after the FET 3 is turned on, the charging voltage of the cycle control capacitor 9 charged in the OFF operation period is applied to the OFF control capacitor 53, causing a charging current to be supplied to the OFF control capacitor 53 to flow in the discharge protective resistor 8 and the discharge resistor 16. As a result, a charging current flowing across the shunt resistor 51, and additionally, the discharging current of the cycle control capacitor 9 are added to the OFF control capacitor 53 to cause the OFF control transistor 5 to perform ON operation promptly, thereby shortening the oscillation cycle To.

Figure 3:
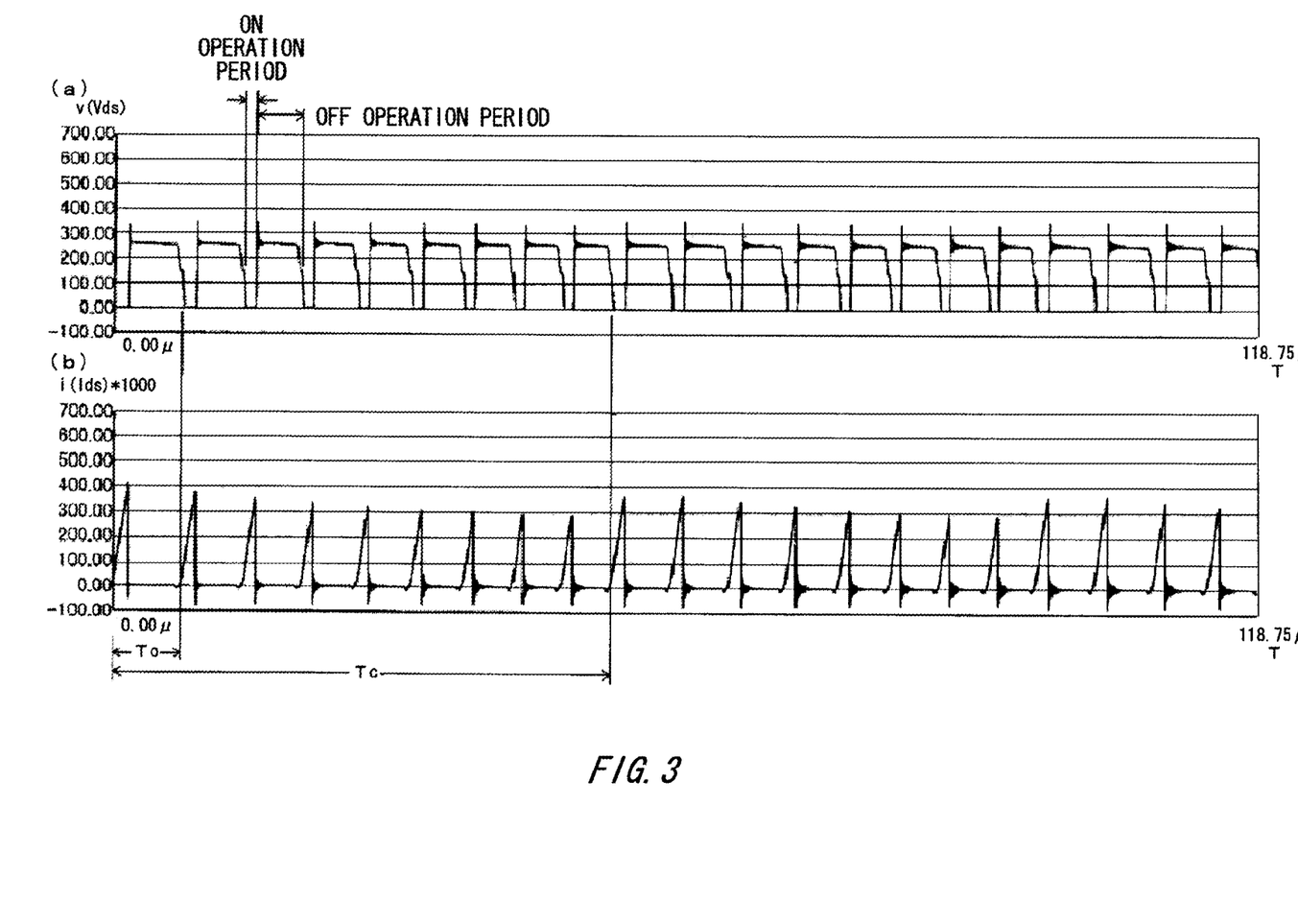
FIG. 3 is a waveform chart showing a voltage between the drain and the source of an FET 3 and a waveform chart showing a primary winding current flowing in the drain and the source of the FET 3, while the self-excited switching power supply circuit 10 performs continuous self-excited oscillating operation under constant voltage control.
Figure 4:
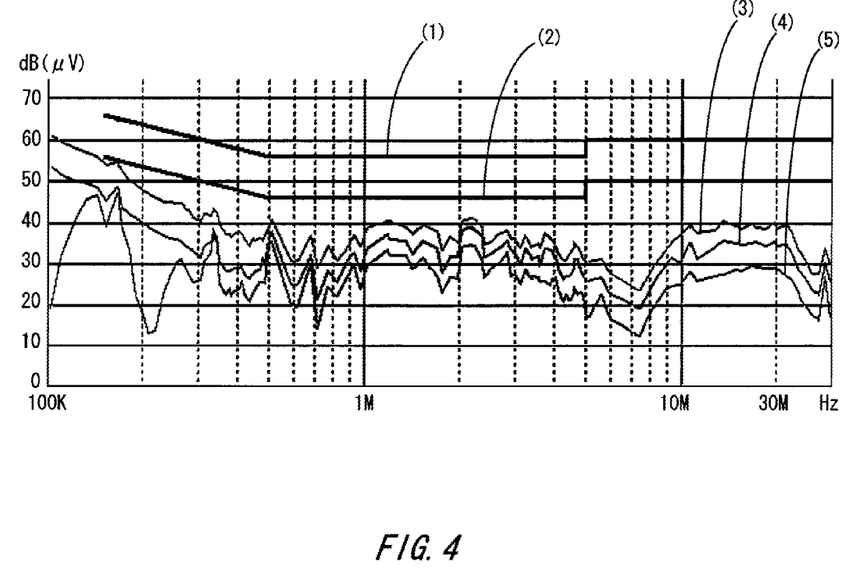
FIG. 4 is a waveform chart showing noise voltage characteristics appearing in the output of the self-excited switching power supply circuit 10 and upper limits specified in International Standard CISPR22 in comparison to each other, and including (1) an upper limit in a QP mode specified in International Standard, (2) an upper limit in an AVR mode specified in International Standard, (3) a peak value of a noise voltage appearing in the output, (4) a noise voltage appearing in the output obtained in the QP mode, and (5) a noise voltage appearing in the output obtained in the AVR mode.

As shown in FIG. 3, the ON operation period is considerably shorter than the OFF operation period in each oscillation cycle To. Thus, more charges are stored in the cycle control capacitor 9 in the OFF operation period in one oscillation cycle To than charges emitted in the ON operation period, so that the charging voltage of the cycle control capacitor 9 is increased gradually by repeating oscillating operation. Meanwhile, a charging current to be supplied from the cycle control capacitor 9 to the OFF control capacitor 53 in the ON operation period in each oscillation cycle To is proportionate to the charging voltage of the cycle control capacitor 9. Thus, the ON operation period is shortened by each oscillating operation to shorten the oscillation cycle To gradually. Namely, the oscillating frequency of the self-excited switching power supply circuit 10 is increased gradually.

If the charging voltage of the cycle control capacitor 9 is increased to a predetermined voltage (in FIG. 2, 2.8 V), a divided voltage obtained by dividing this charging voltage at the voltage dividing resistors 27 and 28 reaches the operating voltage of the NPN transistor 15 to cause a collector current to flow in the collector resistor 19. This forms continuity between the collector and the emitter of the PNP transistor 14, thereby forming continuity between the junction J2 and the low-voltage side terminal 1b. To be specific, the shorting circuit 11 with the NPN transistor 15 and the PNP transistor 14 performs short-circuit operation to emit charges stored in the cycle control capacitor 9, thereby reducing the charging voltage to a potential at a time before the charging voltage starts to increase. As a result, a charging current to flow from the cycle control capacitor 9 into the OFF control capacitor 53 is reduced to extend the oscillation cycle To to a cycle in the previous periodic cycle Tc. The charging voltage of the cycle control capacitor 9 is thereafter increased again with each oscillating operation to repeat the operation of shortening the oscillation cycle To gradually.

In the embodiment, the respective circuit constants of the time constant resistor 7, the cycle control capacitor 9, the voltage dividing resistors 27 and 28, and others are controlled to set the periodic cycle Tc of the short-circuit operation of the shorting circuit 11 at 56.25 μsec as shown in FIG. 3. As shown in (a) of FIG. 3, the ON operation period is 1.38 μsec immediately after the charging voltage of the cycle control capacitor 9 is made to be the minimum potential by the short-circuit operation of the shorting circuit 11. A primary winding current shown in (b) of FIG. 3 that is proportionate to the ON operation period increases to 0.412 A. Thus, much energy is stored in the transformer 2 and the long OFF operation period of 5.54 μsec is provided. Further, one oscillation cycle To is 6.92 μsec and an oscillating frequency is 144.5 kHz.

The charging voltage of the cycle control capacitor 9 is thereafter increased with each oscillating operation to shorten the oscillation cycle To gradually. The ON operation period is shortened to 0.79 μsec in an oscillation cycle that comes immediately before the shorting circuit 11 performs short-circuit operation and in which the charging voltage is increased to a level of about 2.8 V. In this case, the primary winding current is reduced to 0.294 A as shown in (b) of FIG. 3. This causes the flyback voltage to vanish promptly to set the OFF operation period at 4.25 μsec. Further, the oscillation cycle To is shortened to 5.04 μsec to increase an oscillating frequency to 198.4 kHz.

Accordingly, even when making continuous oscillating operation stably under the constant voltage control, the self-excited switching power supply circuit 10 performs oscillating operation not at a fixed frequency, but at an oscillating frequency that changes between 144.5 kHz and 198.4 kHz with the periodic cycle Tc of 56.25 μsec. Thus, harmonic noise generated between the output lines 20a and 20b does not concentrate on a particular frequency, thereby providing sufficient margins of measured values (4) and (5) over respective upper limits (1) and (2) determined in a QP mode (quasi-peak detection) and an AVR mode (average detection) respectively specified in class B of International Standard CISPR22 for information technology equipment (ITE).

As described above, the periodic cycle Tc can be controlled easily by making the resistance values of the voltage dividing resistors 27 and 28 variable. If the periodic cycle Tc is set at 10 μsec or shorter that is close to the oscillation cycle To, the frequency of harmonic noise cannot be distributed sufficiently. Meanwhile, setting the periodic cycle Tc at 66.5 μsec or longer makes the harmonic noise fall within an audible range of 150 kHz or lower, leading to a fear of generation of abnormal noise. Accordingly, it is desirable that the periodic cycle Tc be set within a range of from 10 μsec to 66.5 μsec.

In the embodiment described above, the cycle control capacitor 9 is charged by using the feedback winding 2d used for the constant voltage control and the constant current control. However, the cycle control capacitor 9 may be charged with a flyback voltage generated in a different feedback winding.

In the embodiment described above, the PNP transistor 14 and the NPN transistor 15 are used to form the shorting circuit 11. However, the shorting circuit 11 may be composed of a trigger element such as a thyristor and a triac having output terminals as a pair the opposite ends of each of which are connected in parallel to the cycle control capacitor 9 and placed, for example, between the junction J5 and the low-voltage side terminal 1b, and a trigger terminal connected to the voltage dividing point of the voltage dividing resistors 27 and 28 as a pair.

The embodiment is applied suitably to a self-excited switching power supply circuit that controls an output voltage under constant voltage control.

What is claimed is:

1. A self-excited switching power supply circuit comprising:
    a transformer with a primary winding, a secondary output winding, a first feedback winding, and a second feedback winding;
    an oscillation field effect transistor connected to a DC power supply while being connected in series to the primary winding, the oscillation field effect transistor performing ON operation when a gate voltage thereof is equal to or higher than a threshold voltage $V_{TH}$;
    a start-up resistor connected between a high-voltage side terminal of the DC power supply and a gate of the oscillation field effect transistor;
    an ON control capacitor connected between one side of the first feedback winding and the gate of the oscillation field effect transistor, an opposite side of the first feedback winding being connected to a low-voltage side terminal of the DC power supply, the ON control capacitor applying a voltage for controlling ON of the oscillation field effect transistor to the gate of the oscillation field effect transistor;
    a driver element connected between the gate of the oscillation field effect transistor and the low-voltage side terminal of the DC power supply, the driver element forming continuity between the gate of the oscillation field effect transistor and the low-voltage side terminal if a control terminal voltage is equal to or higher than an operating voltage, thereby controlling OFF of the oscillation field effect transistor;
    a shunt resistor connected between the oscillation field effect transistor and the low-voltage side terminal; and
    an OFF control capacitor connected between a control terminal of the driver element and the low-voltage side terminal, the OFF control capacitor being charged with a voltage of the shunt resistor in which an exciting current from the primary winding flows during ON operation period of the oscillation field effect transistor, thereby increasing the control terminal voltage to the operating voltage or higher, wherein
    the oscillation field effect transistor is turned off with a charging voltage of the OFF control capacitor during the an ON operation period of the oscillation field effect transistor, and is turned on with the charging voltage of the ON control capacitor during OFF operation period of the oscillation field effect transistor, thereby making the ON operation period and the OFF operation period appear repeatedly with a predetermined oscillation cycle, and wherein
    the self-excited switching power supply circuit further comprises:
    a cycle control capacitor connected between the control terminal of the driver element and the low-voltage side terminal;
    a backflow preventing element connected between the second feedback winding and the cycle control capacitor, the backflow preventing element causing a charging current to flow during the OFF operation period of the oscillation field effect transistor to charge the cycle control capacitor with a flyback voltage generated in the second feedback winding;
    a time constant resistor connected between the second feedback winding and the low-voltage side terminal of the DC power supply while being connected in series to the cycle control capacitor, the time constant resistor controlling a speed at which the cycle control capacitor is charged; and
    a shorting circuit connected in parallel to the cycle control capacitor, the shorting circuit forming a short circuit across the cycle control capacitor with a periodic cycle sufficiently longer than the oscillation cycle each time the charging voltage of the cycle control capacitor reaches a predetermined voltage, and
    the OFF control capacitor is charged with the charging voltage of the cycle control capacitor as well as with the voltage of the shunt resistor to shorten the ON operation period until when the driver element turns the oscillation field effect transistor off.

2. The self-excited switching power supply circuit according to claim 1, wherein the cycle control capacitor and the time constant resistor that are connected in series are connected between the second feedback winding and the low-voltage side terminal of the DC power supply while being connected in parallel to an output control capacitor charged with the flyback voltage generated in the second feedback winding of the transformer, and
    the output control capacitor charges the OFF control capacitor with the charging voltage of the output control capacitor during the ON operation period in response to an output voltage exceeding a set voltage.

3. The self-excited switching power supply circuit according to claim 1, wherein the shorting circuit includes series-connected voltage dividing resistors as a pair connected to a pair of opposite sides of the cycle control capacitor, and an NPN transistor having a collector and an emitter connected to the opposite sides of the cycle control capacitor, and a base connected to a voltage dividing point of the voltage dividing resistors as a pair.

4. The self-excited switching power supply circuit according to claim 1, wherein the shorting circuit includes series-connected voltage dividing resistors as a pair connected to the opposite sides of the cycle control capacitor, and any one of a thyristor and a triac having a trigger terminal connected to a voltage dividing point of the voltage dividing resistors as a pair, and an output terminal a pair of opposite ends of which are connected to the opposite sides of the cycle control capacitor.

5. A method of controlling a switching power supply device, comprising controlling application of or shutdown of application of a voltage to a primary side of a transformer by a switching element composed of an oscillation field effect transistor, and transmitting electric power to the secondary side of the transformer to output a voltage, the switching element having a control terminal and connected in series to a primary winding of the transformer, the switching element making ON operation if a voltage generated in a feedback winding of the transformer makes a voltage at the control terminal reach a threshold voltage, the switching element making OFF operation if a charging voltage of an OFF control capacitor controls the voltage at the control terminal to be lower than the threshold voltage, wherein
    a cycle control capacitor is charged with a flyback voltage generated in the feedback winding of the transformer during OFF operation by which an exciting current does not flow in the primary winding of the transformer, the cycle control capacitor receiving a charging voltage that changes within an interval sufficiently longer than one oscillation cycle of the switching element, and the OFF control capacitor is charged with the charging voltage of the cycle control capacitor during ON operation by which the exciting current flows in the primary winding of the transformer, and the charging voltage of the cycle control capacitor changes a speed at which the OFF control capacitor is charged to change the an oscillation cycle of the switching element.

6. The method of controlling a switching power supply device according to claim 5, wherein the charging voltage of the cycle control capacitor increases the speed at which the OFF control capacitor is charged to shorten ON operation period until when the switching element performs OFF operation.

* * * * *